United States Patent [19]

Paini

[11] 4,330,142
[45] May 18, 1982

[54] FORMED HOSE COUPLINGS

[75] Inventor: William R. Paini, Fayette, Ohio

[73] Assignee: Fayette Tubular Products, Fayette, Ohio

[21] Appl. No.: 111,118

[22] Filed: Jan. 10, 1980

[51] Int. Cl.³ .................................................. F16L 33/20
[52] U.S. Cl. .................................... 285/256; 285/259; 285/253
[58] Field of Search ............... 285/256, 259, 253, 382; 29/508, 516, 521

[56] References Cited

U.S. PATENT DOCUMENTS

| | | | |
|---|---|---|---|
| 2,139,745 | 12/1938 | Goodall | 285/259 |
| 2,211,147 | 8/1940 | Miller | 285/259 X |
| 2,230,115 | 1/1941 | Kreidel | 285/259 X |
| 2,371,971 | 3/1945 | Main et al. | 285/259 |
| 2,570,477 | 10/1951 | Paquin | 285/174 |
| 2,631,047 | 3/1953 | Spender et al. | 285/174 |
| 3,017,203 | 1/1962 | Macleod | 285/259 X |
| 3,237,974 | 3/1966 | Press | 285/259 |
| 3,512,810 | 5/1970 | Harris | 285/256 |
| 3,530,900 | 9/1970 | Kish | 285/174 X |
| 4,114,469 | 9/1978 | Kavick | 285/259 |

Primary Examiner—Dave W. Arola
Attorney, Agent, or Firm—Hugh Adam Kirk

[57] ABSTRACT

A deformable metal or plastic tube, the nipple end of which is provided with a plurality of circumferential ribs or grooves and a plurality of aligned longitudinal projections to provide a rough surface over which a resilient rubber or plastic end section of a flexible hose is placed and inwardly compressed against said roughened surface by a sleeve or band to form a fluid-tight seal between the hose and the tube. The grooves or ribs on the nipple portion of the tube are formed by a plurality of radially inwardly pressing dies surrounding the tube on a mandrel. These dies not only reduce the diameter of the nipple but also form aligned rows of projections on the outer surface of the tube by extrusion of the metal between the sides of adjacent dies. One or more and preferably two compressions of the dies are made in different angular positions of the tube. The nipple portion is defined by a previously outwardly pushed bead flange inwardly from the end of the tube. The roughened portion of the tube may also have an outwardly flanged open end. The flexible hose is placed so that its end abuts against the bead. Preferably, a ferrule surrounding the hose is crimped radially inwardly to compress the house around the roughened portion of the nipple, and this ferrule preferably also has an inwardly extending end flange which engages or seats against the bead to protect the end of the hose.

11 Claims, 33 Drawing Figures

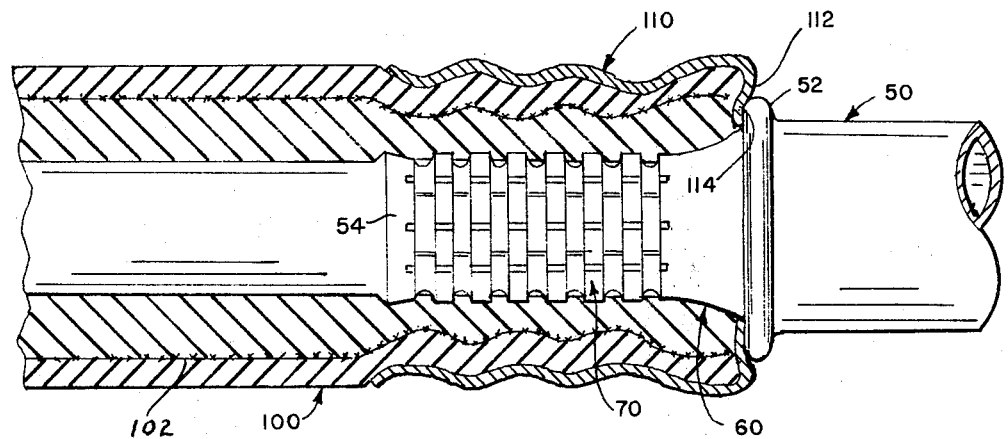
FIG. I
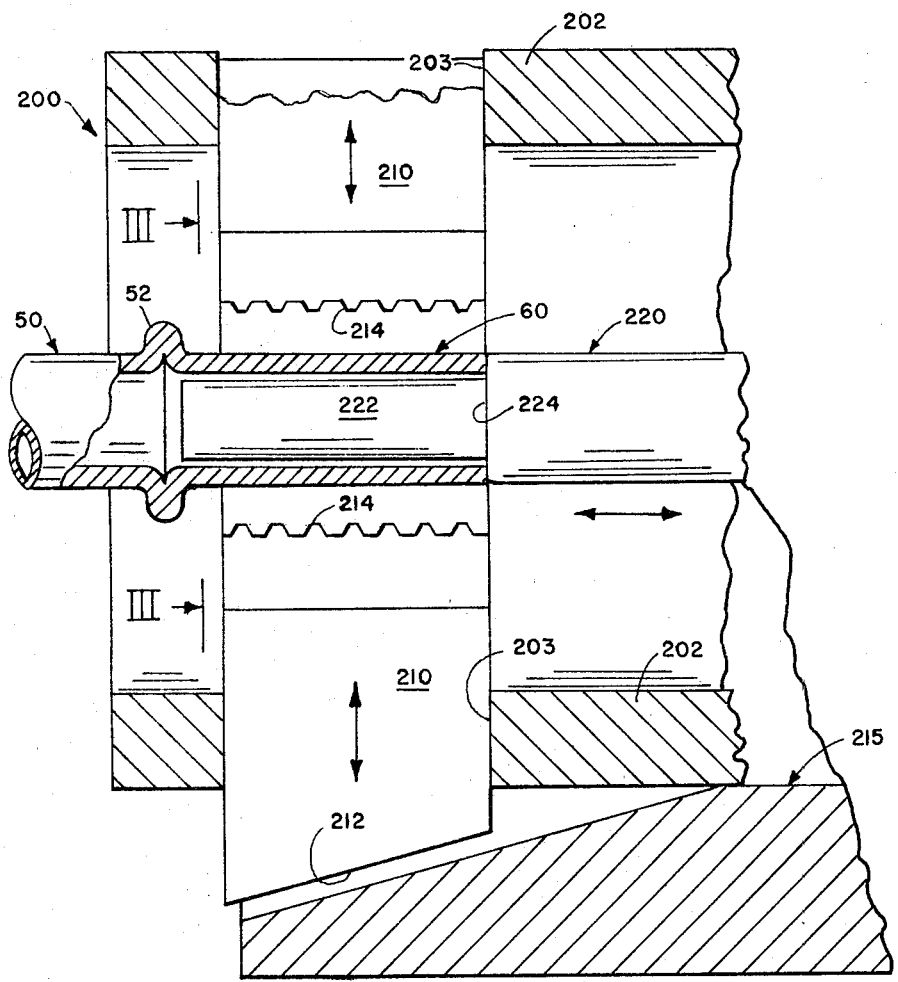
FIG. II

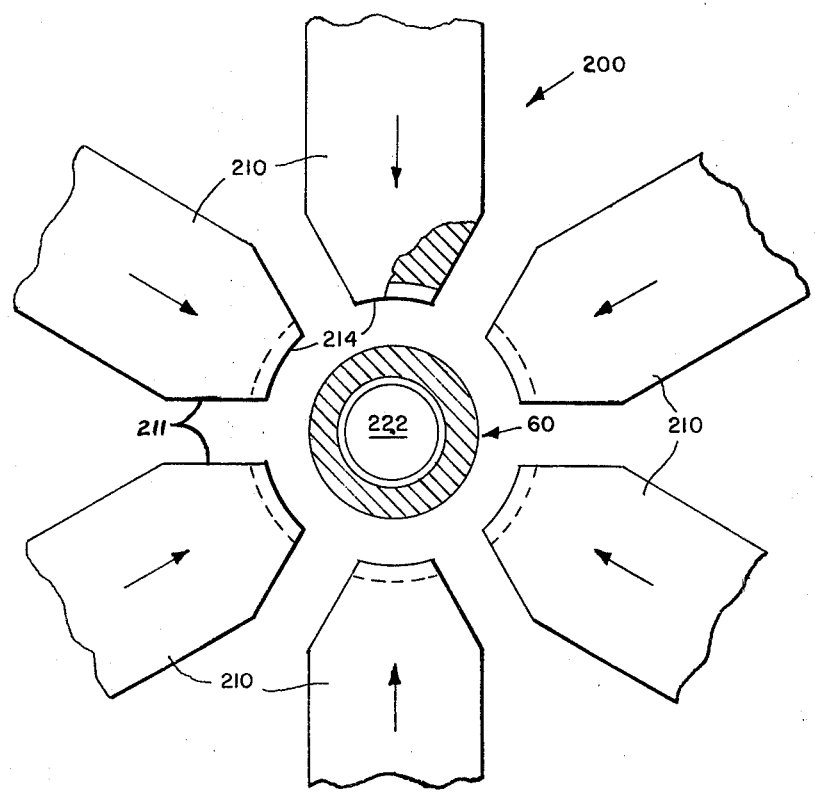
FIG. III
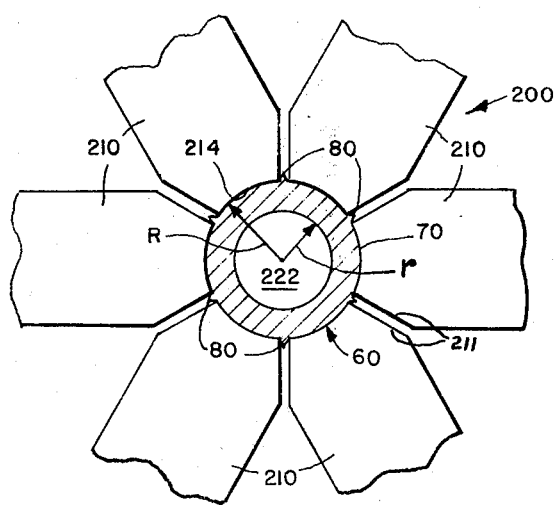
FIG. IV
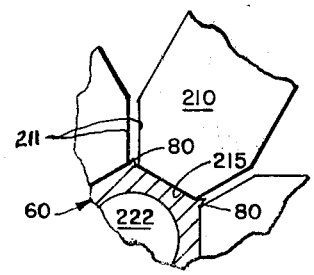
FIG. V
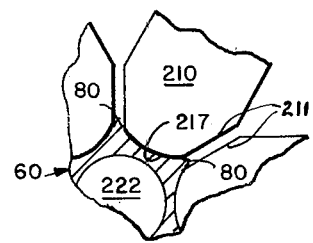
FIG. VI

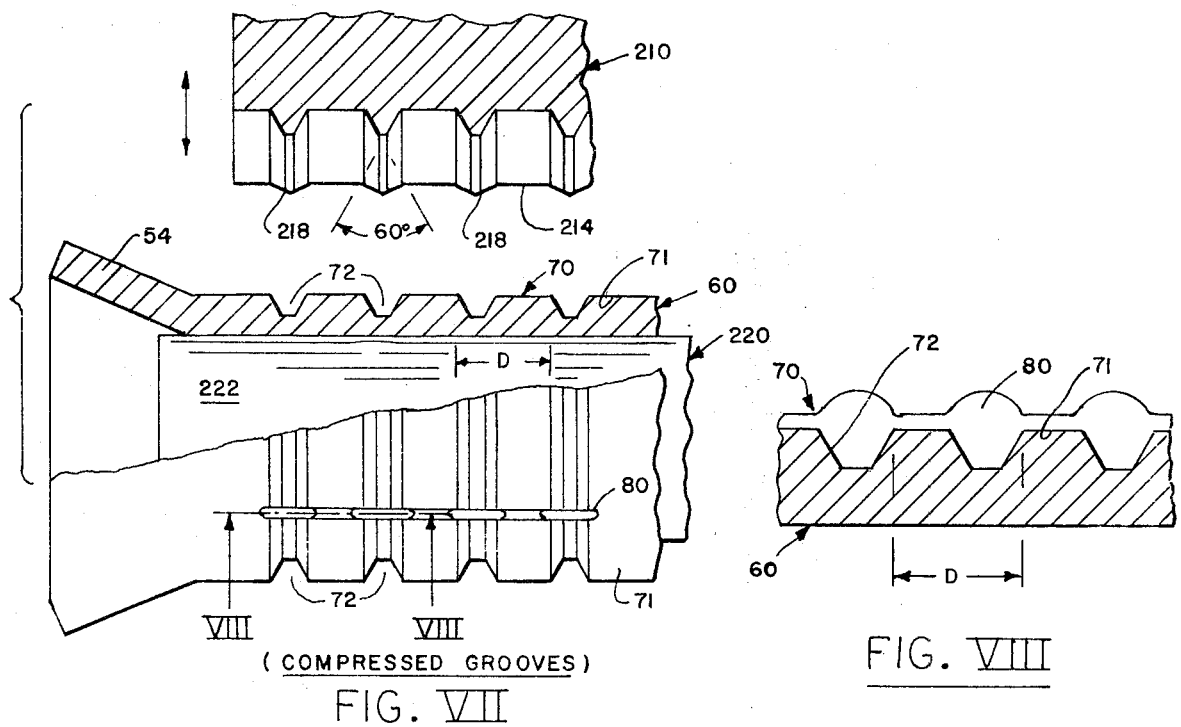
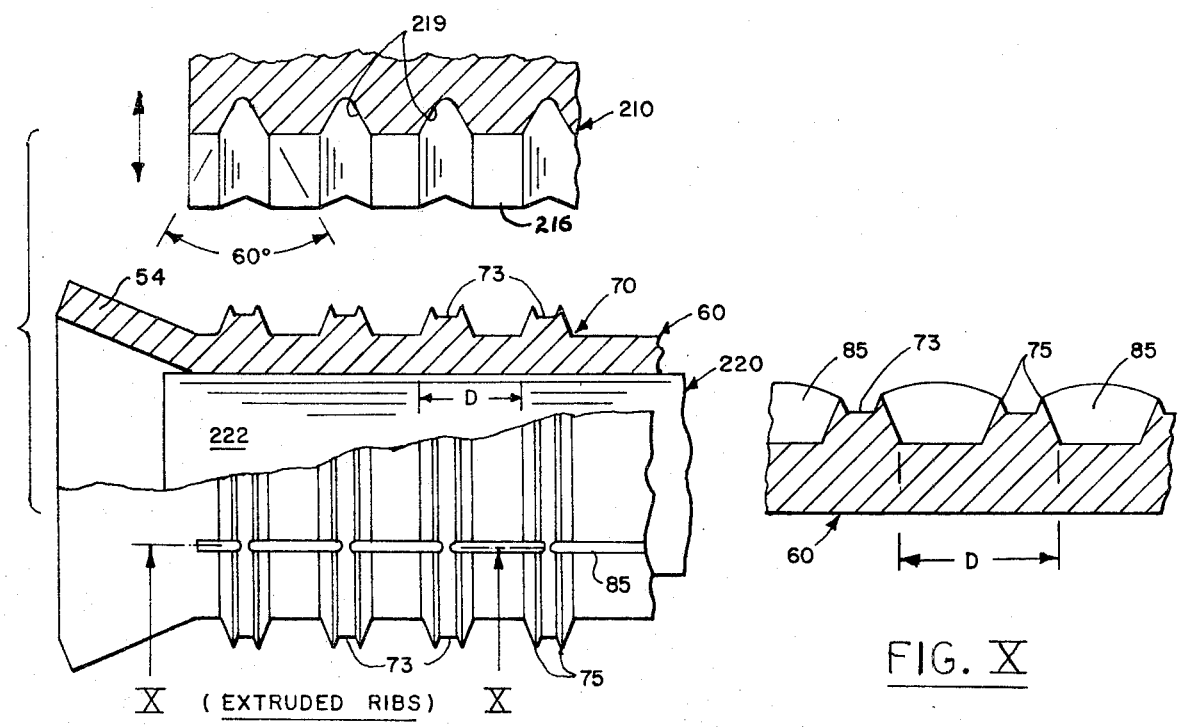

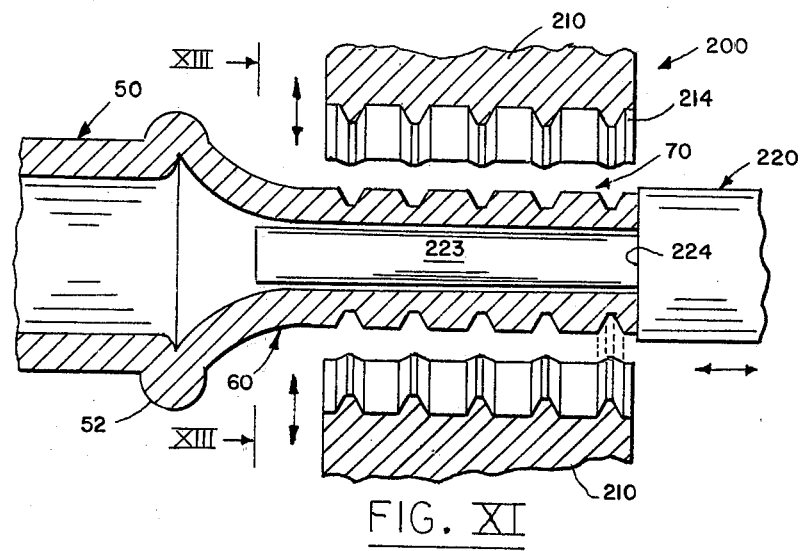
FIG. XI
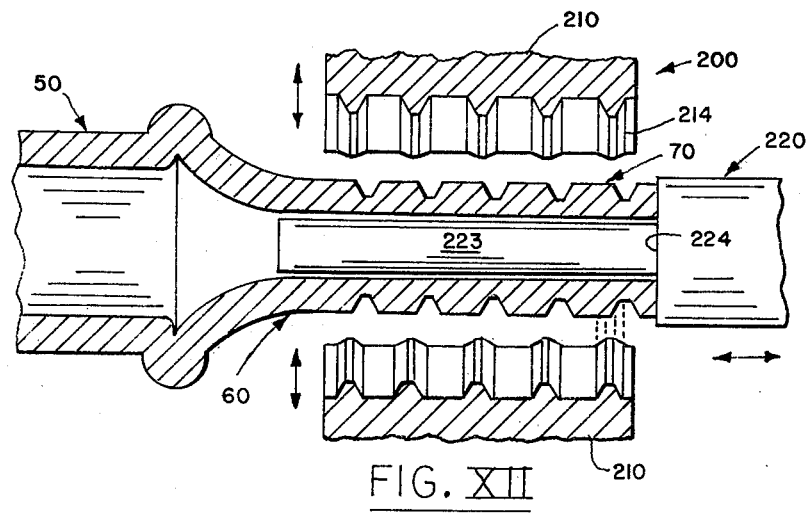
FIG. XII
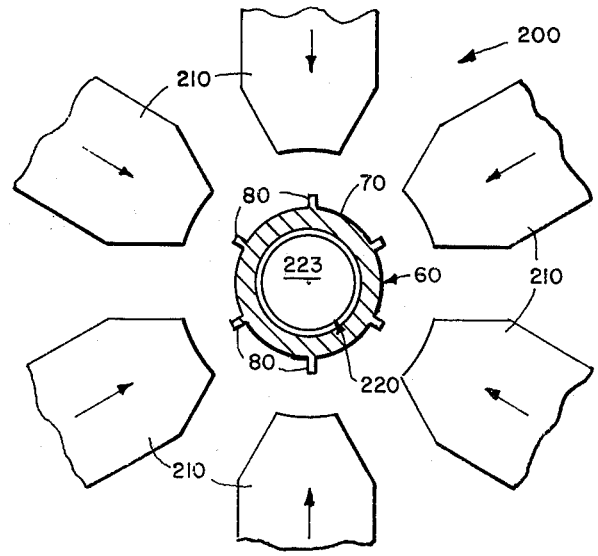
FIG XIII

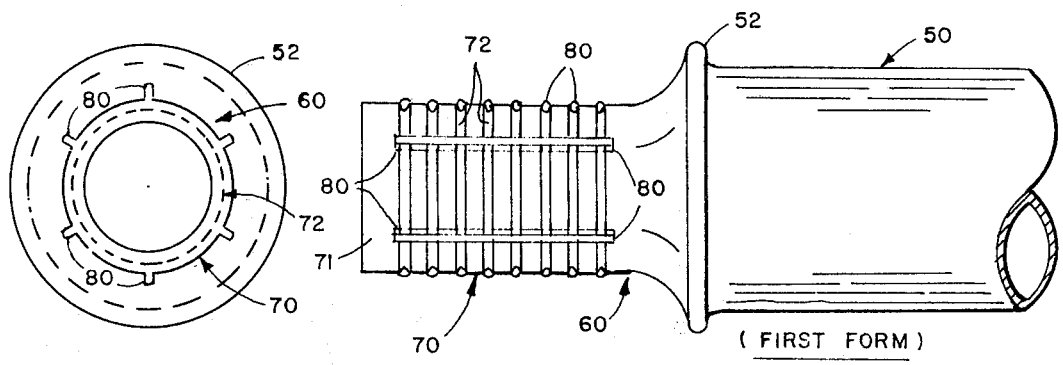
FIG. XV    FIG. XIV (FIRST FORM)
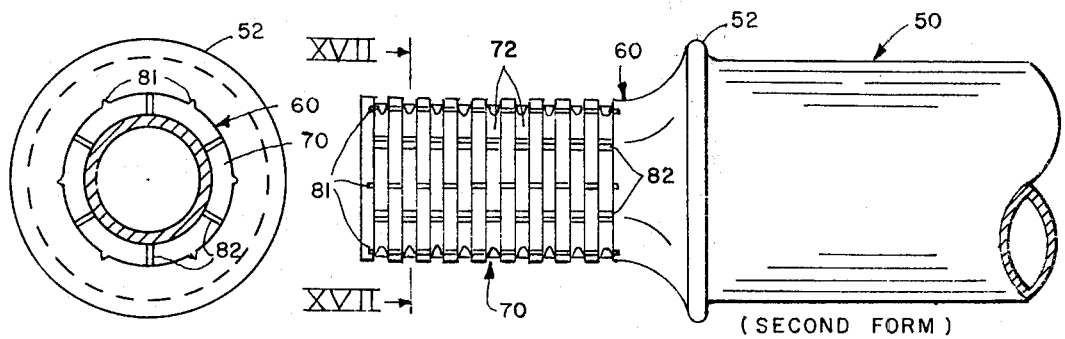
FIG. XVII    FIG. XVI (SECOND FORM)
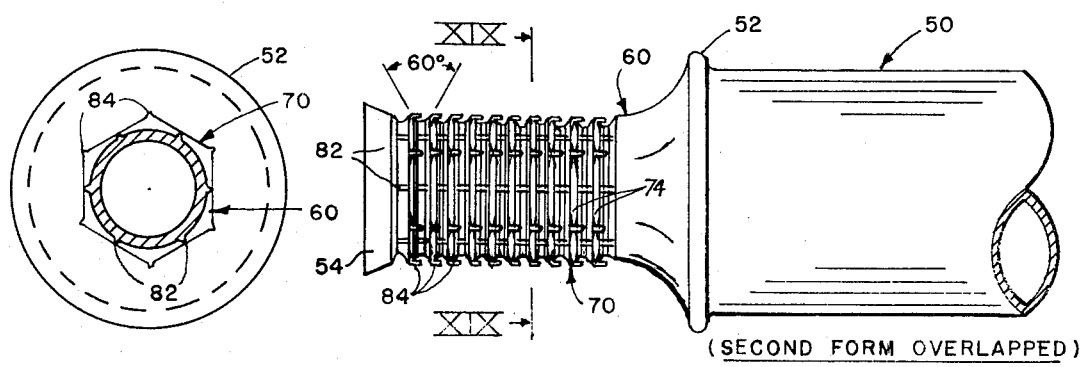
FIG. XIX    FIG. XVIII (SECOND FORM OVERLAPPED)
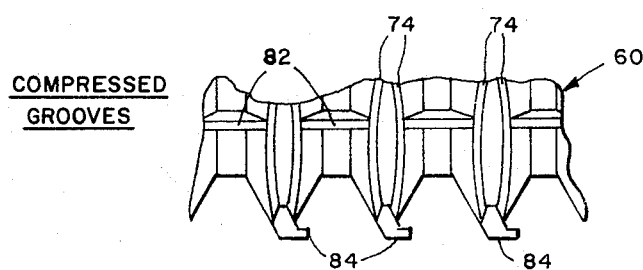
COMPRESSED GROOVES
FIG. XX

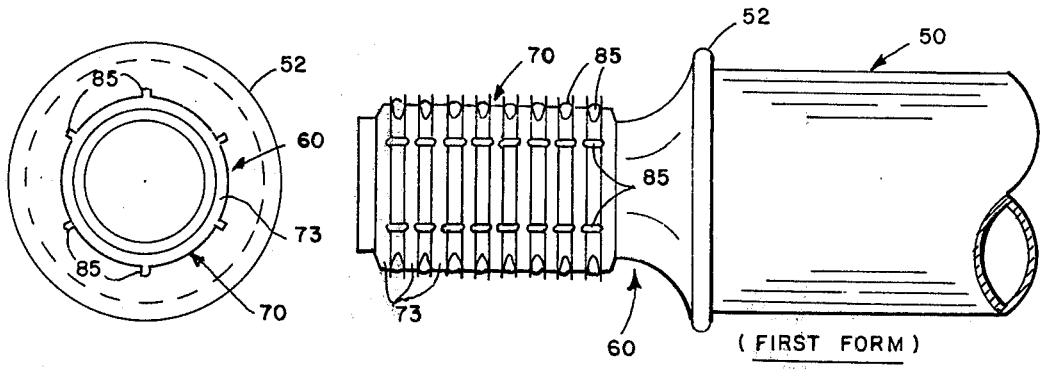
FIG. XXII      FIG. XXI (FIRST FORM)
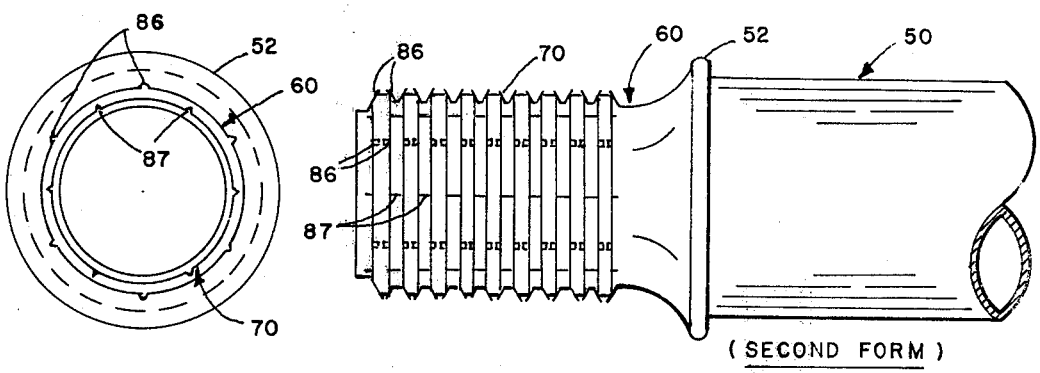
FIG. XXIV      FIG. XXIII (SECOND FORM)
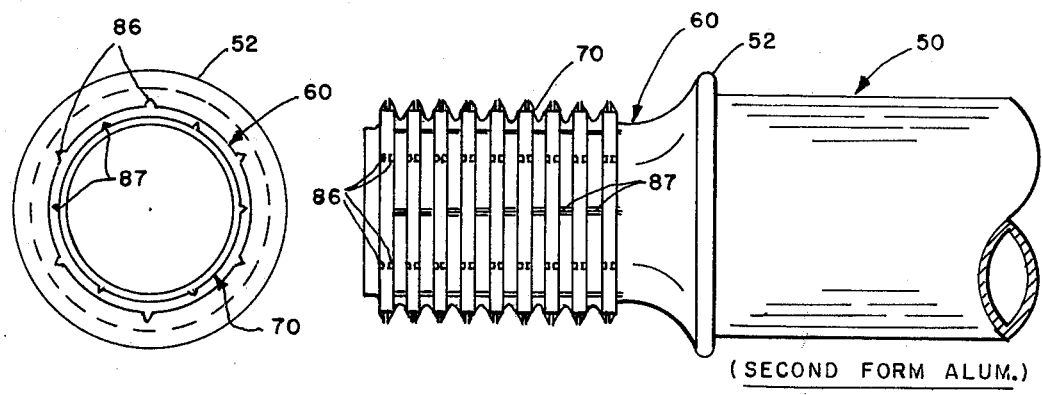
FIG. XXVI      FIG. XXV (SECOND FORM ALUM.)
EXTRUDED RIBS

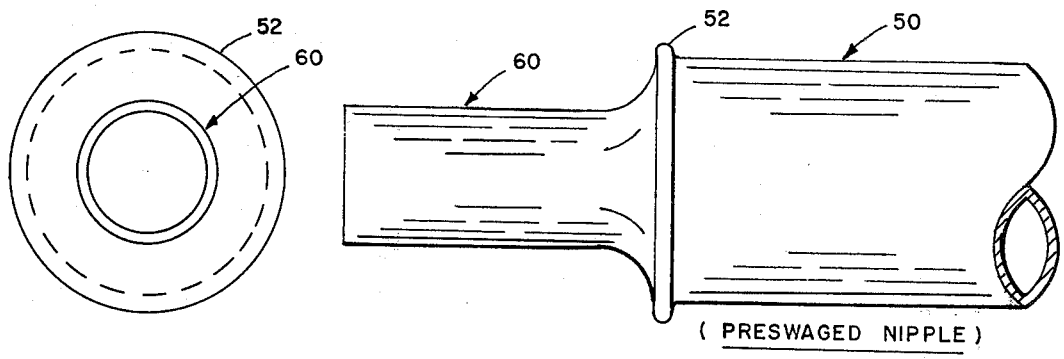
FIG. XXVIII    FIG. XXVII (PRESWAGED NIPPLE)
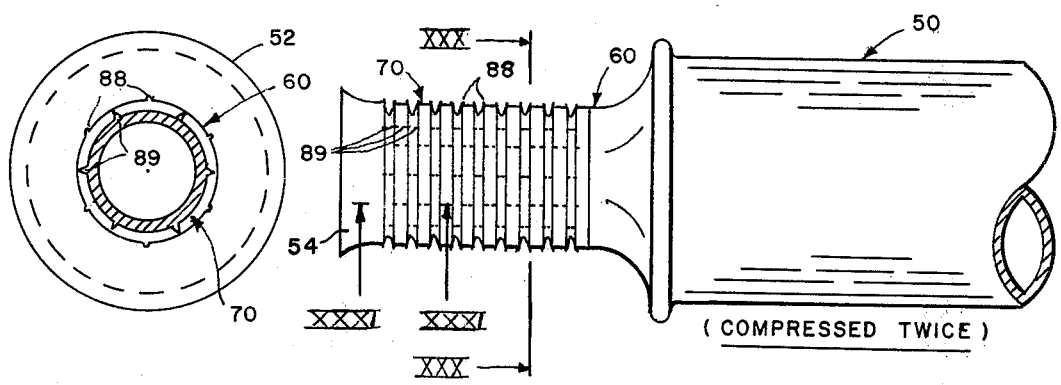
FIG. XXX    FIG. XXIX (COMPRESSED TWICE)
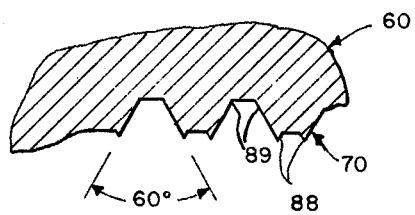
FIG. XXXI

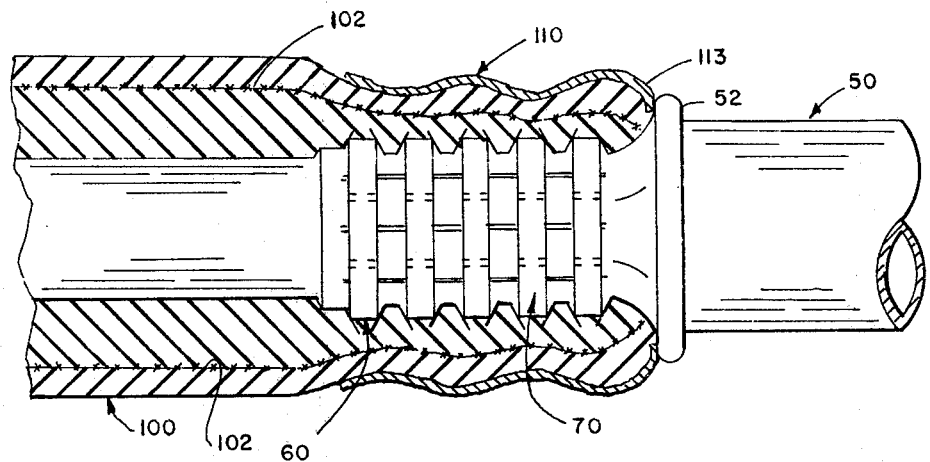
FIG. XXXII
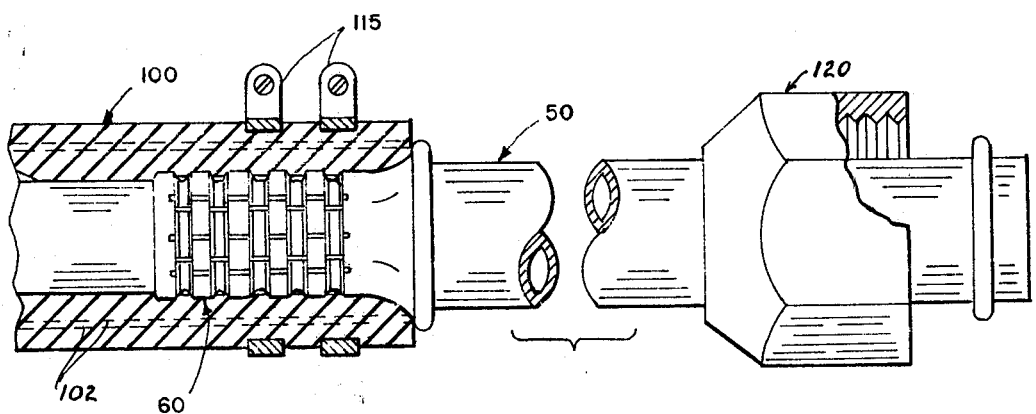
FIG. XXXIII

4,330,142

FORMED HOSE COUPLINGS

BACKGROUND OF THE INVENTION

Couplings for hoses to metal tubes or nipples having roughened surfaces including ribs, grooves and projections, together with surrounding ferrules with flanges abutting beads are well known in the art as shown by the following U.S. Pat. Nos.

| Edelmann | 2,430,921 | November 18, 1947 |
| Macleod | 3,017,203 | January 16, 1962 |

Nipples having ribs, grooves, and barbs are also well known as shown in the following U.S. Pat. Nos.:

| Cooper | 567,962 | September 22, 1896 |
| Browne | 884,461 | April 14, 1908 |
| Weinke | 1,974,635 | September 25, 1934 |
| Davis et al | 2,005,613 | June 18, 1935 |
| Jorgensen | 2,066,473 | January 5, 1937 |
| Goodall | 2,139,745 | December 13, 1938 |
| Kreidel | 2,230,115 | January 28, 1941 |
| Main et al | 2,371,971 | March 20, 1945 |
| Cline et al | 2,805,088 | September 3, 1957 |
| Press | 3,237,974 | March 1, 1966 |
| Kish | 2,526,416 | September 1, 1970 |
| Luckenbill | 3,596,933 | August 3, 1971 |
| Dudek | 3,907,342 | September 23, 1975 |
| Washkewicz et al | 3,966,238 | June 29, 1976 |
| Szentmihaly | | August 15, 1978 |
| Kish | 4,114,656 | September 19, 1978 |

However, most of these roughened surfaces are machined and formed by the removal of metal forming chips which are not acceptable in hose couplings for air conditioning units in which high pressures and temperatures of both liquids and gases are involved.

Ferrules for surrounding the sections of such hose portions engaging nipples are also well known, which ferrules are provided with end flanges which engage beads on or the tubes of the nipples as shown by the following U.S. Pat. Nos.

| Boyle | 2,109,522 | March 1, 1938 |
| Fisher et al | 2,401,921 | June 11, 1946 |
| Doerr | 2,481,730 | September 13, 1949 |
| Paquin | 2,570,477 | October 9, 1951 |
| Spender et al | 2,631,047 | March 10, 1953 |
| Nicol | 3,345,091 | October 3, 1967 |
| Charbonnet | 3,371,408 | March 5, 1968 |
| Kish | 3,530,900 | September 29, 1970 |
| Mingo | | October 5, 1971 |
| Frank | 3,924,883 | December 9, 1975 |

It has been found that the machined ribs, ridges, barbs and/or projections on the nipple portions have, under flexing, vibration, and changes in pressure, caused cutting of the hose and leakage out through the linings and plies of the hose to the end of the hose. The exposed ends of the hose also are often attacked by the oils and greases which occur in the surroundings of the machines with which these hose couplings are used.

Furthermore, in order to seal the ends of the hose with a ferrule having an inwardly extending flange, these flanges previously have been welded to the nipple section. Then in order to assemble the hose into the annular cavities provided by the nipple and ferrule, special machinery is required.

SUMMARY OF THE INVENTION

The hose coupling of this invention comprises a nipple having a roughened surface of alternate larger and smaller diameter portions, a section of rubber hose, and a surrounding ferrule to press the hose against the roughened surface of the nipple. Important features of this invention are: the configurations of the roughened surface of the nipple, the way in which these roughened surfaces are formed, and the construction of the ferrule with an end flange abutting a bead for protecting the end of the hose.

The nipple may be made of any deformable metal or plastic, such as ferrous or non-ferrous metal, steel, stainless steel, aluminum, brass, and the like, and is made of a tubing which is swaged to a lesser diameter than its original diameter before and/or during the formation of a roughened surface on the nipple.

Before the roughened surface is formed on the nipple, the tube section is upset to form an outwardly-pushed circumferential bead which defines the nipple portion of the tube and acts as a stop and abutment for the end of the hose when the coupling is assembled.

The end of the tube which comprises the nipple to which the hose is to be coupled, is then placed into a hydraulic press over a mandrel which press comprises a plurality, such as six, equally angularly spaced and simultaneously radially inwardly projecting dies with parallel arcuate grooves or ribs therein that inwardly swage and roughen the nipple portion of the tube. This roughened nipple comprises adjacent circumferential ribs or grooves, respectively, by extruding the metal into the depressed portions of the dies, or by compression of the projecting portions of the dies to form the grooves. These alternate circumferential larger and smaller diameter portions are formed axially along the nipple's outer surface. Between the adjacent sides of adjacent dies, the metal of the nipple is extruded to form relatively longitudinal aligned projections either substantially continuously the axial length of the nipple or just at or along at least one of the different diameter portions of the nipple surface. These axially aligned projections vary in their extent, sizes and locations, depending upon the shape of the die, the malleability of the nipple, the pressure of the die, the amount of compression of the nipple, the preswaging of the nipple section, the number and relative location of compressions, and the like. Usually the flash or extruded axially aligned projections formed between adjacent dies in the first compression of die forming of the roughened surface of the nipple are too pronounced or too sharp, so the nipple portion is rotated at an angle less than and preferably about half of the angle between adjacent dies and compressed again to decrease or remove such sharp projecting flashings or porjections and form other lesser flash projections intermediate the previously formed flahses or longitudinally aligned ribs or projections. One of the unexpected advantages of forming the nipples in this manner is that the cross-section of the outer surface of the nipple tends to take a polygonal shape corresponding in sides to the number of radially inwardly projecting dies. Thus, not only is the surface roughened, but also reshaped in noncircular cross-section so as to increase the resistance of the hose to rotate on the nipple. The circumferential grooves or ribs prevent the hose from being axially removed from the nipple, namely adding tension resistance to the coupling. Since the configurations, namely the ribs, ridges and projecting portions on the nipple forming its roughened surface, have been formed by compressing dies and not by a cutting machine, no metal has been removed from the nipple, the edges of the ribs and groove projections are not so sharp. Thus the cutting of the inside of the hoses placed over the nipples is reduced, which in turn prevents leakage of pressurized fluid into and between the linings or layers of the hose and out through its adjacent exposed end.

The hose to be connected is then placed over this section and surrounded by a deformable metal band, sleeve or ferrule which preferably has an end flange that extends radially inwardly over the otherwise exposed end of the hose. This inwardly flanged end on the ferrule abuts against the previously upset bead at the inner end of the nipple and preferably has an offset formed therein to seat the bead. The inwardly flanged ferrule is then radially inwardly crimped to compress the hose against the roughened surface of the nipple and also to urge the hose longitudinally against the flanged end of the ferrule to insure a tighter seal and protect the end of the hose from outside contaminants.

This nipple can be formed not only on pipe or tube connectors, but also branches, manifolds, spliced couplings, and other types of configurations to which a hose is to be sealingly coupled. Furthermore, in the event a hose is to be replaced in the field, it can be easily cut and removed from the rough-surfaced nipple, so that another hose can be placed over the nipple and a surrounding hose clamp placed around it, without having to procure a complete new hose and nipple assembly for the system.

OBJECTS AND ADVANTAGES

It is an object of this invention to produce a simple, efficient, effective, economic, high-pressure, vibration- and tension-resistant fluid coupling for a hose to a pipe section.

Another object is to produce such a coupling by compression dies without machining the parts of the pipe section or brazing a ferrule to it.

Another object is to produce such a coupling which can be assembled easily and manually.

Another object is to produce such a coupling in which the end of the hose is protected by a flange on a surrounding ferrule and which hose end is sealed against leakage along the lining or layers of the hose.

Another object is to produce such a coupling in which no chips or burrs occur which are unacceptable for air conditioning system couplings employing high fluid pressures up to 500 psi under vibrating conditions and in the presence of oil and dirt, such as in the air conditioner systems for vehicles.

Another object is to produce a coupling which can be easily cut off, removed and replaced in the field and held tight by means of a screwband hose clamp without having to purchase and install a complete new coupling system or harness.

Another object is to produce a coupling that resists internal and external forces and which is easily adaptable to different types of tubes and different shaped tubes.

A further object is to produce a hose coupling in which the end of the hose is impermeable to outside liquids such as oils, greases, solvents and the like which often occur around and under the hood of a vehicle adjacent the internal combustion engine.

Still another object is to produce a hose-to-pipe coupling, the junction of which is highly resistant to both rotation and tension.

BRIEF DESCRIPTION OF THE VIEWS

The above mentioned and other features, objects and advantages and a manner of attaining them are described more specifically below by reference to embodiments of this invention shown in the accompanying drawings, wherein:

FIG. I is a partial longitudinal sectional view of a coupling according to one embodiment of this invention;

FIG. II is a schematic vertical cross-section of the jaws and the adjacent parts of a press for forming a roughened surface on the nipple part from a piece of tubing to produce a coupling as shown in FIG. I;

FIG. III is a section taken along lines III—III of FIG. II showing the plurality of dies or jaws of the press with a nipple part therein;

FIG. IV is a sectional view similar to FIG. III but with the jaws in their crimping or compressing position;

FIG. V is a view of one of the jaws shown in FIG. IV with a straight or flat surface to form a polygonal cross-sectional outer surface on the nipple;

FIG. VI is similar to FIG. V showing a convex jaw to form a type of longitudinally depressed outer nipple surface;

FIG. VII is an enlarged partial section of a nipple and jaw of a compressing die that has formed the compressed circumferential grooves and axially aligned projections in the first crimping or forming operation on a nipple;

FIG. VIII is an enlarged section taken along line VIII—VIII of FIG. VII showing the axially longitudinal projections formed between the adjacent compressing jaws;

FIG. IX is similar to FIG. VII but showing an extruding-type die that has formed the extruded circumferential ribs and axially aligned projections in a first crimping or forming operation on a nipple;

FIG. X is an enlarged section taken along line X—X of FIG. IX showing the axially longitudinal projections or ribs formed between adjacent extruding jaws;

FIG. XI is a view similar to FIG. II with the jaws and nipple in position for a second crimping operation with the circumferential ribs and grooves aligned with corresponding grooves and ribs in the jaws;

FIG. XII is a view similar to FIG. XI but with the ribs in the jaws out of alignment or partly overlapping the grooves placed in the nipple in the first forming operation;

FIG. XIII is a view taken along line XIII—XIII of FIG. XI showing the first longitudinal ribs rotated to be out of alignment with the spaces between adjacent jaws and to be crushed in the second crimping or forming operation;

FIG. XIV is a side elevation of an aluminum tube and nipple after having been formed or crimped once in compressing jaws similar to those shown in FIGS. II, III and VII;

FIG. XV is a left end view of the nipple shown in FIG. XIV;

FIG. XVI is a view of the nipple shown in FIG. XIV after its second crimping or forming operation in accordance with the aligned circumferential grooves as shown in FIGS. XI and XIII;

FIG. XVII is a section taken along line XVII—XVII of FIG. XVI showing the axial longitudinal projections between adjacent jaw members in both the first and second crimping operations;

FIG. XVIII is a view of the nipple shown in FIG. XIV after its second crimping operation with overlapping grooves and jaws as shown in FIGS. XII and XIII;

FIG. XIX is a section taken along line XIX—XIX of FIG. XVIII showing the polygonal type of outer surface of the nipple;

FIG. XX is an enlarged view of the end of the second crimped nipple shown in FIG. XVIII showing how the first formed axial longitudinal projections are pushed to overhang the circumferential grooves during the offset second crimping operation, and also the formation of intermediate circumferential grooves in the tops of the first formed circumferential ribs;

FIG. XXI is a side elevation of a steel tube and nipple after having been formed or crimped once in extruding jaws similar to those shown in FIG. IX;

FIG. XXII is a left end view of the nipple shown in FIG. XXI;

FIG. XXIII is a view of the steel tube shown in FIG. XXI after its second crimping or forming operation in accordance with the aligned circumferential ribs as shown in FIGS. IX and XI;

FIG. XXIV is an end view of the steel tube and nipple shown in FIG. XXIII;

FIG. XXV is a view of an aluminum tube which has been crimped in both the first and second operations according to the extruding or circumferential rib-forming dies shown in FIGS. IX and XIII;

FIG. XXVI is a left end view of the aluminum nipple shown in FIG. XXV;

FIG. XXVII is a side elevational view of a preswaged nipple on a metal tube with a flange bead;

FIG. XXVIII is a right end view of the tube and nipple shown in FIG. XXVII;

FIG. XXIX is a side elevation of the preswaged nipple shown in FIG. XXVII after it has been crimped or formed twice in dies similar to those shown in FIGS. II, III, VII, IX and XIII;

FIG. XXX is a sectional view taken along line XXX—XXX of FIG. XXIX;

FIG. XXXI is an enlarged radial sectional view taken along line XXXI—XXXI of FIG. XXIX showing the axial longitudinal projections formed in the nipple between adjacent jaws;

FIG. XXXII is a view similar to FIG. I but without the seat in the radial flange on the ferrule because of the lesser radial thickness of this flange; and FIG. XXXIII is a view similar to that shown in FIG. 1 except instead of the ferrule as shown in FIGS. I and XXXII a pair of hose clamps clamp the hose onto the nipple, and there is also shown a nut coupling on the end of the tube opposite that of the nipple and hose connection.

DETAILED DESCRIPTION OF PREFERRED EMBODIMENTS

FIG. I is exemplary of the type of coupling of this invention which comprises a rigid but deformable metal or plastic tube 50 which has an upset near the end thereof to form a bead flange 52 which defines a reduced diameter nipple portion 60 between the bead 52 and the end of the tube which may have an outwardly flared flange 54. This nipple portion 60 has a roughened surface 70 surrounded by the end of a flexible hose 100 which is compressed against the roughened portion 70 by means of a crimped ferrule 110 which has an inwardly radially extending flange portion 112 that abuts against the bead 52 to seal the exposed end of the hose 100.

THE NIPPLE-FORMING APPARATUS

Referring to FIGS. II through XIII there are shown parts of a press 200 for forming the roughened surface 70 of the nipple portion 60 of the tubes 50 of the coupling of this invention. More parts of this press 200 are shown in FIG. II, which parts comprise a stationary tubular guide member 202 having radial slots 203 therein for radially inwardly and outwardly guiding a plurality, herein six, equally angularly spaced crimping jaw members 210. The outer end of these members 210 have tapered cam surfaces 212 engaged by a surrounding frusto-conical annular cam member 215. Although FIGS. III, IV, and XIII show six equally angularly spaced jaw members 210, more or fewer jaw members can be used from a minimum of three up to as many as may be desired. Thus, as the member 215 moves axially in the direction of the arrow 213, the jaw members 210 move radially inwardly toward the nipple portion 60 as more clearly shown in FIGS. IV, V and VI. The horizontal movement of the cam member 215 is preferably made by a hydraulic cylinder under fluid pressure (not shown).

Centrally of the press 200 there is provided a mandrel 220 and 222 as shown in FIGS. II through VII and IX, XI, XII and XIII, which mandrel has a reduced diameter section 222 or 223 and a shoulder 224 that positions and limits the outer end of the nipple portion 60 and also limits the inward compression of the nipple 60. This mandrel 220, however, has different outside diameter sections depending upon the size of the nipple and for each of its compressing, forming or crimping operations. Furthermore, the mandrel 220 is preferably attached to a separate hydraulic cylinder (not shown) for retraction of the mandrel from the nipple portion 60 after each compression, crimping or swaging operation.

The crimping or forming surfaces 214 through 217 of the jaws 210 (see FIGS. II through VII and IX) may have different configurations as desired for producing different shapes and types of roughened surfaces 70 through 75 on the nipples 60. These surfaces may vary, depending upon the amount of crushing or deforming of the surface to be made, as well as the composition and malleability of the nipple portions 60 of the tubes 50.

The jaw crimping surface 214 shown in FIG. VII contains compressing ribs 218 having converging angular surfaces of between about 50° and 70°, preferably about 60°. These ribs 218 form circumferential grooves 72 in the cylindrical surface 71 of the nipple 60 as part of its roughened surface 70. Preferably there are provided throughout the length of the ferrule a plurality of such grooves 72 and preferably more which correspond, of course, to the number of ridges or ribs 218 in the jaws of dies 210.

Another form of die or crimping surface 216 is shown in FIG. IX wherein instead of containing ribs 218 it has grooves 219. The side angles of these grooves 219 also are between about 50° and 70° with respect to each other, or preferably about 60°. When these dies 216 engage the cylindrical surface of the nipple 60, the circumferential ribs 73 are pushed up from the compressed cylindrical surface of the nipple 60 into the grooves 219 to form part of the roughened surface 70 of that nipple 60.

When the jaw members or dies 210 are in their compressed position as shown in FIGS. IV, V, and VI to form the roughened surfaces on the nipples 70, some of the malleable cylindrical surfaces of the nipple portions 60 are also pressed up in between each of the adjacent radial surfaces 211 of adjacent jaw members or dies 210 to form aligned rows of flashings or axial or longitudinal ribs or projections 80 through 89 as shown on all the roughened nipple surfaces 70, and these projections 80 through 89 form an important and essential feature of the roughened surfaces 70.

Although FIGS. III and IV show the contacting surfaces 214 of the dies 210 to be arcuately concave according to the radius R (see FIG. IV), the surface may take other configurations, namely being flat like the surface 215 shown in FIG. V or may be convex as the surface 217 as shown in FIG. VI without departing from the scope of this invention. Preferably the radius R shown in FIG. IV is slightly less than the normal outside diameter or radius of the nipple portion 60 before it has been crimped or compressed the first time in that the crimping operation reduces or swages the nipple portion 60 to a lesser diameter and inwardly against the mandrel 222 shown in FIG. II which also has a small radius r shown in FIG. IV than the preformed inside diameter of the nipple portion 60 as shown in FIG. II. Then when the nipple portion is swaged a second time as shown in FIGS. XI, XII, and XIII, an even smaller diameter mandrel portion 223, than the portion 222, is employed so that further swaging and reduction of the internal diameter can take place if desired during the second crimping or forming operation.

Since the first crimping operation does reduce the diameter of the nipple portion 60, it may also be elongated so that the location of the end of the nipple and/or the bead 52 with respect to the edges of the circumferential grooves and ribs may be changed. Therefore, the distance of the shoulder 224 on the mandrel 220 in the first crimping operation as shown in FIG. II with respect to the edge of the jaws 210 may be less than the distance in FIG. XI. On the other hand, if a different roughened nipple surface configuration is to be made, the forming ribs 214 or grooves 219 may overlap the grooves 72 and ribs 73 formed on the nipple in the first forming operation so that additional circumferential grooves and ribs can be formed in the nipple, which can be done by locating the shoulder 224 at a different distance from the jaws 210 as shown in FIG. XII as distinguished from the alignment shown in FIG. XI. Then a configuration as shown in FIGS. XVIII and XIX can be obtained as will be described later in the next chapter.

It also is important that in the second crimping operation that the nipple be rotated so that the axial longitudinal ribs or flashing projections 80 to 89 be centered between the sides of the jaws and compressed by the jaws in the second operation as shown in FIG. XIII so that these projections will not be too pronounced, sharp and/or abrupt to cause cutting of the hose section 100 when placed on the nipple.

Furthermore, different shaped jaws than the jaws 214 and 216 may be used without departing from the scope of this invention even between the first and second crimping or forming operations.

NIPPLE PORTION

Referring now to FIGS. XIV and XV and back again to FIGS. VII and VIII, the nipple portion 60 is shown grooved with parallel circumferential grooves 72 with transverse longitudinal projections or axially extending ribs 80 which ribs 80 or flashings extend out above the tops of the normal cylindrical surface of the nipple, as well as way above the grooves 72 as more specifically shown in FIGS. VIII and XV. These longitudinal ribs 80 which extend not only above the tops of the grooves 72, but also above the normal cylindrical surface 71 of the nipple portion 60 are continuous and often are sharp enough to cut into the hose section 100 when placed thereover. Therefore, it is desirable that a second crimping of the nipple be made, such as that shown in FIGS. XI and XIII to produce the second form of the nipple shown in FIGS. XVI and XVII in which the original longitudinal projecting ribs 80 have been decreased or crushed to form lesser longitudinal ribs 81 over outer cylindrical surface of the nipple and intermediate thereof to form additional longitudinal ribs 82 (see FIGS. XVI and XVII) which ribs 82 extend only over the grooves 72 or smaller diameter portions of the nipple. As a result, there are two sets of six axially longitudinally aligned rib projections 81 and 82, one set of which occurs on the outer surface or larger diameter portions of the circumferential sections of the nipple portion, and the other of which occur in the grooves 72 or lesser or smaller diameter portions of the nipple section.

These adjacent larger and smaller diameter portions of the section have been identified in FIGS. VIII and X as comprising a distance D which is equivalent to a pitch distance of a thread, so that it can be said that there is at least one outwardly projecting longitudinal or axially extending portion in each distance or part D comprising one larger and one smaller diameter portion adjacent each other on the nipple. As stated before and as shown in FIGS. VIII and XIV, this longitudinal rib may extend clear across the section D of both portions thereof. However, in the embodiments described later of different types of materials and different types of dies, these longitudinal projections 80-89 can vary to be only on either the larger or the smaller diameter portions, or only those portions, or only on the intermediate frusto-conical portions between them, or any combination thereof. In any event, it is important that there are axially aligned projections 80-89 in each section D of the roughened surface of the nipple which has both adjacent and alternate circumferential larger and smaller diameter portions.

In the event that the second forming operation is not aligned so that the ribs 218 are not impressed in the same grooves 72 as they were before, but as in the operation disclosed in FIG. XII, then a nipple having the configuration as shown in FIGS. XVIII, XIX and XX is produced in which the larger diameter sections are provided with parallel circumferential ridges 74 as shown in FIGS. XVIII and XX and the longitudinal ribs 80 are crushed to overlap the grooves 72 and form groove-overlapping projections 84 as shown in FIG. XX. Furthermore, the outer circumferential surface of the nipple approaches that of a polygon or hexagon as shown in FIG. XIX. Thus, the offset or overlapping second forming or crimping operation produces a much rougher surface to the nipple 60 as shown in FIG. XVIII from that shown in FIG. XVI for the same sort of material, herein an aluminum-type tube which metal is more malleable than a steel composition tube.

Referring now to forming a nipple with an extruding die having the surface 219 as shown in FIG. IX to extrude circumferential ribs 73 or larger diameter portions as shown in FIGS. IX and X, and also in FIGS. XXI through XXVI, the first forming operation provides the upstanding ribs 73 which may have slightly outward extending circumferential ribs 75 along their outer edges of these ribs 73. Bridging the normal smaller diameter cylindrical surface of the nipple 60 are the axial longitudinal projections 85, which for aluminum-type tube and nipple can extend above the outer surface of the ribs 73 as shown in FIG. X. However, in steel tubes and nipples these projections 85 are not quite so pronounced as shown in FIGS. XXI and XXII, wherein these longitudinal rib projections 85 do not extend quite so far above the outer extruded cylindrical surface of the nipple 60 as they do for aluminum.

In both types of composition tubing for nipples, the second forming operation according to that for the aligned ribs as shown in FIGS. XI and XIII, there are produced respectively nipples as shown in FIGS. XXIII, XXIV and XXV, XXVI for steel and aluminum, respectively. In these particular second formed nipples, the longitudinal axially extending projections on each section D of adjacent larger and smaller diameter portions of the nipples are not so pronounced on the steel tubes and nipples as they are on the aluminum tube nipples shown in comparing FIGS. XXIII and XXIV with FIGS. XXV and XXVI. In these second forming operations for the steel shown in FIGS. XXIII and XXIV, the first formed longitudinal ribs 85 are compressed to form pairs of projections 86 on the larger diameter portions, while the other newly formed intermediate longitudinal ribs 87 are much less pronounced and just extend across the bottoms of the smaller diameter portions. For the softer and more malleable aluminum tube nipples shown in FIGS. XXV and XXVI, the longitudinal projections 86 are more pronounced as are the longitudinal projections 87 in the smaller diameter portions intermediate the larger diameter portions.

Referring now to FIGS. XXVII through XXXI there is shown in FIGS. XXVII and XXVIII a tubular portion 50 which has had its nipple portion 60 preswaged to reduce its diameter before being placed in the crimping jaws according to the forming steps of FIGS. II through XIII of this invention. When a nipple as shown in FIGS. XXVII and XXVIII is thus doubly formed in the crimping jaws 210 according to this invention, a roughened nipple of the type shown in FIGS. XXIX, XXX and XXXI is produced. In such preswaged nipples both the circumferential grooves and ribs, as well as the longitudinally axially aligned projections are less pronounced than they are in the nipples that have not been preswaged. These longitudinal projections 88 and 89 shown in FIG. XXXI comprise relatively small outwardly extending ribs 89 in the smaller diameter portions and relatively small outwardly extending tabs 88 along the edges only of the larger diameter portions of the nipple.

It is to be understood that any one or more combinations of the different shaped dies, concave, straight, or convex, and aligned or overlapping for the second or even more forming operations, or just one forming operation, may be employed for producing the roughened surfaces of the nipples according to this invention. Also each formed nipple has not only adjacent circumferential smaller and larger diameter portions in succession along the length thereof of at least three and preferably five in number, or more, as may be desired, but also has axially longitudinally aligned along each section D of adjacent larger and smaller circumferential portions, at least one, if not a continuous, outwardly projecting rib portions formed by the flashing between adjacent jaw dies 210. These outwardly axially aligned projections restrict the rotation of the hose 100 that is clamped thereon, while the circumferential larger and smaller diameter portions restrict the tension of the hose from the nipple. Thus, a non-leaking and fluid-tight seal is provided between the hose 100 and the nipple 60 which is accentuated by the ferrule 110 or hose clamps 115 that are clamped around the hose section outside of the nipple 60 to insure contact therewith.

THE HOSE AND FERRULE

Referring now to FIGS. I, XXXII and XXXIII, there are shown roughened nipple surfaces 70 surrounded by the ends of flexible hoses 100 which hoses may be provided with intermediate braids or innerlinings 102 which are exposed at the outer end of the hose section.

Around the portion of the hoses 100 which surround the roughened surfaces 70 of the nipples 60, there is preferably provided a sleeve, band or ferrule 110 which preferably has an inwardly radially extending flange portion 112 or 113 as shown in FIGS. I and XXXII. The flange portion 112 has a seat portion 114 as shown in FIG. I for fitting tighter or snugly against the flange bead 52 to seat for better sealing off the exposed end of the hose 100 and its exposed liners or braids 102. Thus, in the event there is any puncturing of the inner wall of the hose 100 so that high-pressure fluid would leak in between the layers, it would have less chance of escaping out through the end of the hose adjacent the bead 52.

Once the ferrule 110 is in place around the end of the hose section and around the roughened surface 70 of the nipple 60, the ferrule 110 is radially inwardly compressed in a press containing jaws similar to those shown for press 200 in FIGS. II and III. This compression or crimping of the ferrule 110 not only embeds the inner lining surface of the tube 100 into the circumferential ribs and/or grooves 71–75 and into the longitudinal or axial projections 80–89 of the roughened surface 70, but also urges the end of the hose 100 longitudinally against the flanged portion 112 of the ferrule 110 and simultaneously urges the flange 112 and/or its seat 114 against the flange bead 52. If the flange 112 is not sufficiently broad radially to provide an offset seat portion 114 as shown in FIG. I, such as in smaller diameter nipples and hoses, then a flange 113 as shown in FIG. XXXII is provided.

In the event that the hose 100 may have to be replaced and a new harness or hose and coupling are not readily available, the ferrule 110 and hose 100 may be cut from the roughened surface 70 of nipple 60, and another hose 100 may be placed thereon, and a wedding-type or screw clamp band or bands 115 may be clamped around the outside of the hose 100 as shown in FIG. XXXIII to provide a sealed coupling. Thus the couplings of this invention can be repaired easily in the field without having to procure a whole new harness or coupling connection.

The clamping of the hose 100 against the roughened nipple 60 by the inwardly crimped ferrule 110, not only seals the coupling against high fluid pressure even when being vibrated, but also restricts rotation or twisting of the hose 100 on the nipple 60 as well as tension to pull the hose 100 from the nipple 60. The compression of the hose 100 by the ferrule 110 also seals its end against the flange 112 or 113 of the ferrule 110 to protect it from outside dirt, oil and solvents as well as to seal its exposed inner linings or layers 102.

It should be clearly understood that the nipple 60 may have a roughened surface 70 placed on any type of a connection or pipe 50, such as also shown in FIG. XXXIII with a female-type threaded nut 120 thereon, or the roughened nipples 60 may be placed on branching ducts, or both ends of a tube 50 without departing from the scope of this invention. Of course, different diameter tubes and nipples can be produced and correspondingly different diameter dies 210 and mandrels 222 and 223 would be used therefor.

While there is described above the principles of this invention in connection with specific apparatus and the method of producing the same, it is to be clearly understood that this description is made only by way of example and not as a limitation to the scope of this invention.

What is claimed is:

1. A serviceable-type hose coupling for a tube comprising:
    (A) a tubular nipple end on the tube over which a section of said hose snugly fits, said nipple having:
        (a) a plurality of parallel segmented circumferential alternate larger and smaller diameter portions, said portions having connecting walls diverging outwardly at an angle between about 50° and 70° from said smaller diameter portions,
        (b) a plurality of at least three equally angularly spaced axially extending rows of outward projections, at least one projection extending from each of said larger diameter portions,
        (c) and a radially outwardly extending circumferential flange bead at the inner end of said nipple,
    (B) a compressible hose snugly fitting over said nipple and against said bead, and
    (C) a ferrule fitting over said hose and having a radial end flange against the end of said hose and abutting against said bead of said nipple, said ferrule being radially inwardly compressed around said hose to urge said hose against said larger and smaller diameter portions of said nipple and to urge said hose axially against the inside of said flange of said ferrule which in turn is urged against said bead to form a seal to protect the end of said hose.

2. A hose coupling according to claim 1 wherein said rows of outward projections are in each of said smaller diameter portions.

3. A hose coupling according to claim 1 wherein each of said outward projections are along the sides between each of said smaller and larger diameter portions.

4. A hose coupling according to claim 1 wherein said outward projections are over at least a portion of each larger and smaller diameter portion.

5. A hose coupling according to claim 1 wherein said outward projections extend continuously longitudinally throughout all said smaller and larger diameter portions.

6. A hose coupling according to claim 1 wherein said nipple has a type of polygonal shaped radial cross-section for its outer roughened surface.

7. A hose coupling according to claim 1 wherein said flange portion of said ferrule has a seat portion for said bead.

8. A hose coupling according to claim 1 wherein said nipple has an outwardly flared flange at its open outer end from the tube.

9. A serviceable-type hose coupling for a tube comprising:
    (A) a tubular nipple end on the tube having a radially outwardly extending bead at its inner and tube end, and a plurality of circumferential alternate larger and smaller diameter portions and a plurality of axially aligned equally angularly spaced rows of radial outward projections, at least one of said projections extending from each of said larger diameter portions,
    (B) a compressible hose snugly fitting over said nipple and against said bead, and
    (C) a ferrule fitting over said hose and having a radial end flange against the end of said hose and abutting against said bead of said nipple, said ferrule being radially inwardly compressed around said hose to urge said hose against said projections and said larger and smaller diameter portions of said nipple and to urge said hose axially against the inside of said flange of said ferrule which in turn is urged against said bead to form a seal and to protect the end of said hose.

10. A hose coupling according to claim 9 wherein said flange portion of said ferrule has a seat portion for said bead.

11. A hose coupling according to claim 9 wherein said nipple has a type of polygonal shaped radial cross-section for its outer roughened surface.

* * * * *

UNITED STATES PATENT AND TRADEMARK OFFICE
CERTIFICATE OF CORRECTION

PATENT NO. : 4,330,142
DATED : May 18, 1982
INVENTOR(S) : William R. Paini

It is certified that error appears in the above–identified patent and that said Letters Patent are hereby corrected as shown below:

Column 1, line 30, insert in the middle column the patent number - - 4,106,526 - -; line 52, insert in the middle column the patent number - - 3,610,665 - - .

Signed and Sealed this

Seventh Day of September 1982

[SEAL]

Attest:

GERALD J. MOSSINGHOFF

Attesting Officer

Commissioner of Patents and Trademarks